United States Patent [19]
Dickie

[11] Patent Number: 5,556,061
[45] Date of Patent: Sep. 17, 1996

[54] MOUSE PAD

[75] Inventor: Robert G. Dickie, Nowmarket, Canada

[73] Assignee: Mousepad Innovations Inc., King City, Canada

[21] Appl. No.: 307,213

[22] Filed: Sep. 16, 1994

[51] Int. Cl.$^6$ ..................................................... B43L 15/00
[52] U.S. Cl. ........................... 248/51; 248/118; 248/918; 248/346.01
[58] Field of Search ................................ 298/346.01, 51, 298/118, 118.1, 118.3, 118.5, 918, 346.03, 346.5; 400/715, 718

[56] References Cited

U.S. PATENT DOCUMENTS

| | | |
|---|---|---|
| D. 328,892 | 8/1992 | Miller . |
| D. 331,045 | 11/1992 | Moerke . |
| 4,053,701 | 10/1977 | Ogilvie et al. .................. 312/223.6 X |
| 4,453,687 | 6/1984 | Sweere .................................. 248/51 X |
| 4,799,054 | 1/1989 | House . |
| 5,058,840 | 10/1991 | Moss et al. . |
| 5,074,511 | 12/1991 | Wilson . |
| 5,131,614 | 7/1992 | Garcia et al. . |
| 5,158,257 | 10/1992 | Wilson . |
| 5,165,630 | 11/1992 | Connor . |
| 5,201,485 | 4/1993 | Moss et al. . |
| 5,203,845 | 4/1993 | Moore ..................................... 248/118 |
| 5,217,781 | 6/1993 | Kulpers . |
| 5,228,655 | 7/1993 | Gacia et al. . |
| 5,265,835 | 11/1993 | Nash . |
| 5,339,213 | 8/1994 | O'Callaghan ..................... 312/223.6 X |
| 5,398,895 | 3/1995 | Whetherhult et al. .................... 248/51 |
| 5,433,407 | 7/1995 | Rice ..................................... 248/118.1 |

FOREIGN PATENT DOCUMENTS

| | | |
|---|---|---|
| 2084157 | 5/1994 | Canada . |
| 2245162 | 1/1992 | United Kingdom ................. 312/223.6 |

OTHER PUBLICATIONS

*MacWeek,* "Formico Accessory Promises Ergonomic Mousing", 25 Jan. 1993, vol. 7, p. 9.
Direct Micro, "Happy 1994 Accessories Sale", Dec. 1993, 1 page.
Package Cover entitled: "Mouse Platform" by Ring King Visibles, Inc. Muscatine, Iowa, undated.
Brochure entitled: "Mouse Arm", by Ring King Visibles, Inc. Muscatine, Iowa, dated 1994.
Brochure entitled: "Centrex New the 'Freedom Station'", undated, Centrex, Inc. Maine, U.S.A.
Brochure entitled: "Mouse Arena the Ultimate Mouse Pad", undated, Forminco, Quebec, Canada.
Brochure entitled: "Mouse Rink", undated, Forminco, Quebec, Canada.

*Primary Examiner*—Karen J. Chotkowski
*Attorney, Agent, or Firm*—Jeffrey T. Imai; Arne I. Fors; D. Doak Horne

[57] ABSTRACT

A mouse pad apparatus has a molded base, a pad, and a cord retainer. The molded base has a streamline profile and an outer peripheral surface surrounding a well adapted for receiving the pad. The outer peripheral surface has two adjacent sides extending substantially perpendicular to each other and two opposite sides extending arcuately from the adjacent sides. The two opposite sides each has a contoured wrist supporting surface extending outwardly from the well. The cord retainer is between the two adjacent sides. The cord retainer is an open passageway integrally molded in the outer peripheral surface and an molded cover for covering the passageway. The pad is affixed to said base within the well. The well has a depth wherein when the pad is fully registered therein the pad extends substantially co-planar with the adjacent and opposite sides. A plurality of rubber feet extend from an underside of the base. The cord is threadable through the cord retainer in either a right-handed or left-handed direction and the mouse pad apparatus is orientable relative to a computer keyboard in either a right-handed configuration or a left-handed configuration.

16 Claims, 3 Drawing Sheets

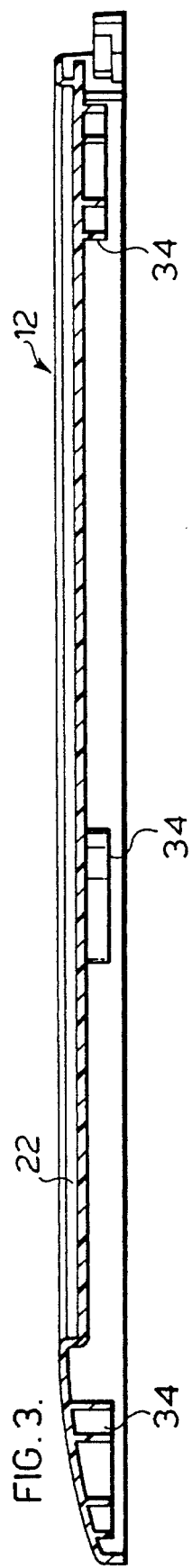
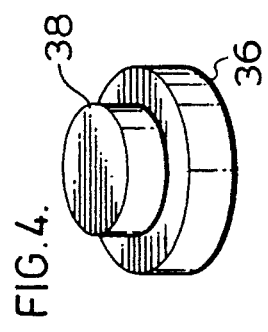
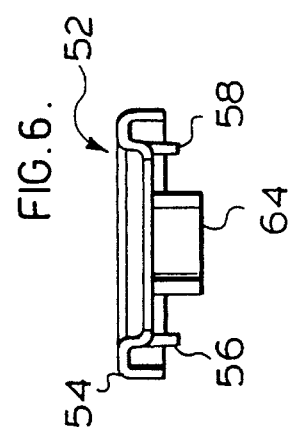
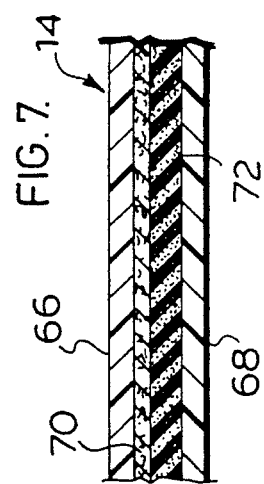
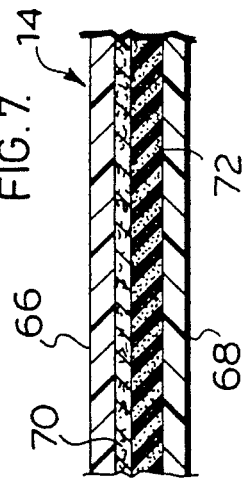
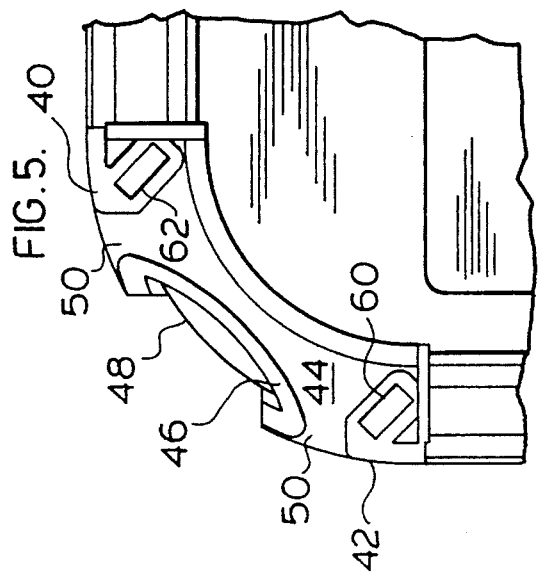

MOUSE PAD

FIELD OF INVENTION

This invention relates to an improved mouse pad apparatus having a cord retainer for retaining the cord of the mouse and a surface for ergonomically supporting a wrist of an operator in either a left handed or right handed condition.

BACKGROUND OF INVENTION

The computer mouse has become a standard peripheral for the personal computer. In order to make the mouse operate more efficiently, mouse pads have been proposed such as those described in U.S. Pat. Nos. 5,217,781 and 4,799,054. Both of the devices disclosed in these patents provide a surface which enhances the movement of the mouse body relative to the mouse ball for more effective manipulation of the pointer on the computer screen.

Although these devices have been helpful in improving the maneuverability of the pointer on the computer screen, the wire connection between the mouse and the computer housing becomes a problem. The extensive use of the mouse will pull the wire onto the mouse pad surface creating an inconvenient obstruction. The user is then required to lift the mouse and remove the connecting wire.

The extensive and continuous use of the mouse has been identified as one source of repetitive strain injuries in the workplace. As a result of the operator continuously undergoing the same and repetitive motion such as manipulating the mouse, computer operators are at a higher risk of sustaining repetitive strain injury.

Various wrist supporting devices have been proposed in an attempt to reduce repetitive strain injury. Such wrist rest supports are disclosed in U.S. Pat. Nos. 5,131,614, 5,165,630, 5,201,485, 5,228,655 and 5,265,835.

In still yet another device, commercially available from Forminco Inc. of Quebec, Canada, under the trademark MOUSE ARENA, a combination mouse pad and wrist support is provided. The device comprises a blow molded base having a mouse pad surface affixed within a well in the blow molded base. The base has two channels on the underside thereof adapted to slidably receive a bar on which is mounted a curved rest support which elevates the wrist of the user above the mouse pad. The wrist support bar may be inserted in either of the two channels to arrange the device in either a left handed or right handed configuration. The blow molded body is designed such that the mouse pad is inclined to the horizontal. A spring is mounted on the blow molded body. The spring has a pigtail for receiving the wire cord of the mouse. The user serpentines the cord through the pigtail elevating the cord out of the plane of the mouse pad surface.

Although the Forminco Inc. mouse pad and wrist support has experienced success in the marketplace, it still suffers from two important drawbacks. First, the spring for retaining the mouse cord elevates the cord out of the plane of the mouse pad surface. The user is still able to pull the cord through the pigtail and thus must be still periodically retracted. If the pigtail is wound too tightly the user will constantly tug on the spring increasing the risk of repetitive strain injury. Secondly, the device has several parts which must be manually assembled prior to packaging and subsequently by the user. This increases the cost of manufacture and also increases the size and amount of packaging required for each unit.

SUMMARY OF THE INVENTION

The disadvantages of the prior art may be overcome by providing a mouse pad apparatus which has a cord retainer for retaining the mouse cord in the plane of the mouse-receiving surface of the mouse pad.

It is desirable to provide a mouse pad apparatus having a surface which is ergonomically designed to support the wrist of the user to minimize repetitive strain injury as the user manipulates the mouse about the mouse-receiving surface. The mouse pad apparatus has a streamline contour to comfortably support the wrist.

According to one aspect of the invention, there is provided a mouse pad apparatus having a cord retainer for retaining a cord of a computer mouse substantially co-planar with a mouse-receiving surface of the apparatus.

According to another aspect of the invention, there is provided a mouse pad apparatus comprising a molded base, a pad, and a cord retainer. The molded base has a streamline profile and an outer peripheral surface surrounding a well adapted for receiving the pad. The outer peripheral surface has two adjacent sides extending substantially perpendicular to each other and two opposite sides extending arcuately from the adjacent sides. The two opposite sides each has a contoured wrist supporting surface extending outwardly from the well. The cord retainer is between the two adjacent sides. The cord retainer is an open passageway integrally molded in the outer peripheral surface and an molded cover for covering the passageway. The pad is affixed to said base within the well. The well has a depth wherein when the pad is fully registered therein the pad extends substantially co-planar with the adjacent and opposite sides. A plurality of rubber feet extend from an underside of the base. The cord is threadable through the cord retainer in either a right-handed or left-handed direction and the mouse pad apparatus is orientable relative to a computer keyboard in either a right-handed configuration or a left-handed configuration.

According to another aspect of the invention, there is provided a base for a mouse pad. The base has a surface for receiving the mouse pad and a cord retainer for retaining a cord of a computer mouse in the plane of a mouse-receiving surface of the mouse pad.

According to another aspect of the invention, there is provided a base having a wrist supporting surface which is contoured to provide a rounded transition between a surface on which the base is supportable and a mouse-receiving surface.

DETAILED DESCRIPTION OF THE DRAWINGS

In figures which illustrate the embodiment of the invention,

FIG. 3 is a cross-sectional view of the molded base of FIG. 2 along the lines 3—3;

FIG. 4 is a perspective view of a foot of the mouse pad apparatus of FIG. 1;

FIG. 5 is a top plan view of the molded portion of the cord retainer of the mouse pad apparatus of FIG. 1;

FIG. 6 is a side elevational view of the cover of the cord retainer of the mouse pad apparatus of FIG. 1;

FIG. 7 is a sectional view of the pad of the mouse pad apparatus of FIG. 1;

DETAILED DESCRIPTION OF THE INVENTION

Figure 1:
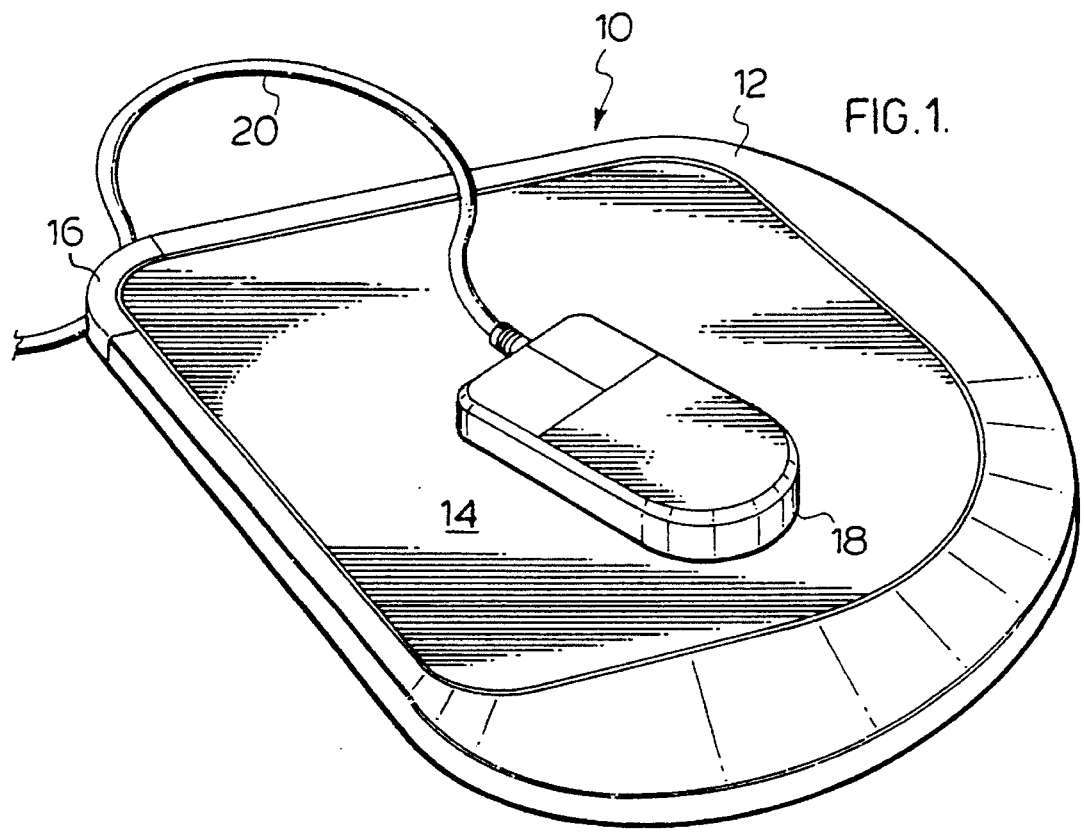
FIG. 1 is a perspective view of the mouse pad apparatus of the present invention together with a computer mouse.

The present invention is generally illustrated in FIG. 1. The mouse pad apparatus 10 of the present invention generally comprises a molded base 12, a mouse receiving pad 14, and cord retainer 16. As illustrated, mouse 18, having a cord 20, travels over a mouse-receiving surface of pad 14 for manipulating the pointer on the computer screen (not illustrated). Cord 20 is retained by cord retainer 16 in the same plane as the pad 14.

Figure 2:
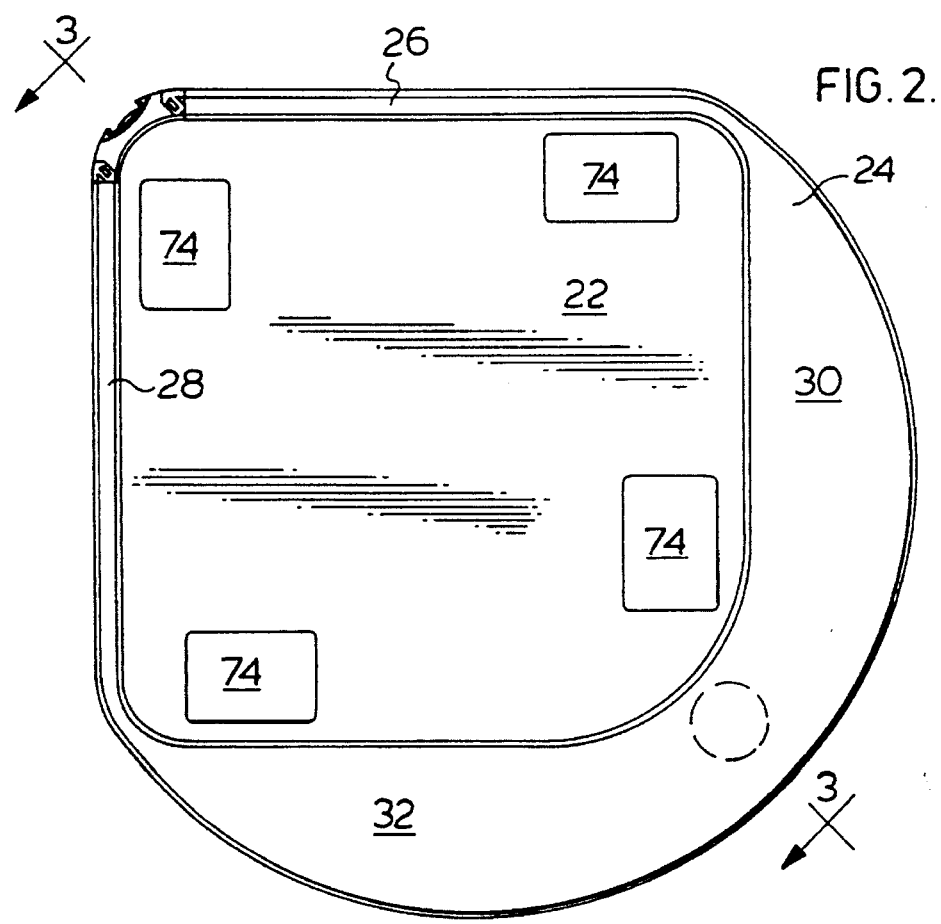
FIG. 2 is a top plan view of molded base of the mouse pad apparatus of FIG. 1 with the pad removed.

Referring to FIG. 2, a top view of the molded base 12 is illustrated with the pad 14 removed and exposing the well 22. Surrounding the well is the outer peripheral surface 24 which surrounds the well 22. Peripheral surface has two adjacent sides 26 and 28 and two opposite sides 30 and 32. Opposite sides 30 and 32 are ergonomically designed, being gently rounded as the surface extends radially from the center of the well 22 outwardly to the periphery thereof, defining wrist supporting surfaces. The wrist supporting surfaces provide a contoured transition between a support surface on which the mouse pad apparatus rests and the mouse-receiving surface of pad 14. The wrist supporting surfaces extend approximately 180° about the molded base 12.

The depth of well 22 is approximately equal to the thickness of pad 14, such that the upper surface of pad 14 is substantially co-planer with the upper peripheral edge of adjacent walls 26 and 28 and opposite sides 30 and 32.

The molded base 12 has a low or streamline profile which does not raise the mouse substantially above the support surface on which the mouse pad apparatus 10 rests. The user's forearm will rest upon the supporting surface, while the wrist rests upon the wrist supporting surfaces of opposite sides 30 and 32. In this manner, the user's arm is resting comfortably while operating the mouse 18.

The molded base 12 is generally of a rectangular configuration defined by adjacent sides 26 and 28 and sloping opposite sides 30 and 32. In plan view, the mouse pad apparatus 10 generally has a baseball playing field configuration wherein the pad 14 defines the infield and the opposite sides 30 and 32 define the outfield.

Referring now to FIG. 3, molded base 12 has a plurality of integrally molded foot receptacles 34 spaced about the underside surface thereof for stably supporting mouse pad apparatus 10. Foot receptacles 34 are tubular shaped projections extending downwardly from the underside of the molded base 12.

FIG. 4 illustrates each foot plug 36. Foot plug 36 has an upper portion 38 which is cylindrical and sized to frictionally engage foot receptacle 34 in a non-slip fashion. The size of foot 36 is such that the feet will raise the molded base 12 slightly above the supporting surface. Preferably, each foot plug 36 is made of a rubber material which substantially prevents the mouse pad apparatus 10 from sliding about the surface. Other suitable non-slip materials may also be used. Further, only the bottom exposed face of each foot plug need to be covered with a non-slip material.

Although the preferred embodiment has illustrated rubber feet plugs to reduce slippage of the mouse pad apparatus relative to its support surface, it is understood that any method of non-slippage is within the scope of this invention. For example, the foot receptacles could be replaced with a non-slip coating on the lower outer perimeter of the molded base 12.

Referring now to FIG. 5, the cord retainer 16 is more particularly illustrated. Integrally molded in the molded base 12 are two pin receiving slot walls 40 and 42, defining slots 60 and 62, which extend upwardly from surface 44. Between walls 40 and 42 is an upwardly extending wall 46. On the outer periphery of wall 46 has an opening 48. As is apparent, between walls 42 and 46 and 40 and 46, an open passageway having entry points 50 is defined. Entry points 50 are sized to receive a standard cord of a computer mouse.

Referring now to FIG. 6, the cover 52 is illustrated. Cover 52 has an upper surface 54 which is contoured to extend substantially co-planer with adjacent sides 26 and 28. The cover 52 has two pins 56 and 58 which extend downwardly and are spaced to frictionally engage slots 60 and 62 of pin receiving slot walls 40 and 42. Cover 52 has a wall 64 having a complementary shape to opening 48. Cover 52 is generally contoured to be flush with the molded base 12 when pins 56 and 58 are fully registered within slots 60 and 62 covering the passageway while leaving passageway entry points 50 open.

Referring now to FIG. 7, a cross-section of the pad 14 is illustrated. The pad 14 comprises an upper layer 66, a lower layer 68, a compressible layer 70 and a support layer 72. The upper layer 66 and lower layer 68 can be made from a PVC plastic which is heat sealed around the outer perimeter of the pad 14. The compressible layer 70 can be any compressible material such as open-celled foam or similar substances. The compressible layer provides some "give" to the upper surface to enhance the rollability of the mouse ball over the pad 14. Support layer 72 can be cardboard, plastic or other light weight rigid material. Optionally, a neoprene pad could be substituted for pad 14.

Referring back to FIG. 2, the well 22 has a plurality of adhesive pads 74 spaced about the surface thereof. When pad 14 is presented to the well, adhesive pads retain pad 14 therein as an integral unit. Other forms of adhesives namely glue, hook and loop fasteners, double sided adhesive tape would also suitably retain the pad 14 within the well 22.

The molded base 12 of the present invention can easily be molded using conventional injection molding techniques using conventional plastic materials. The cover 52 can be injection molded separately and be available for assembly. Pad 14 can also be manufactured using well known techniques. The unit can be quickly assembled by inserting a foot 36 into each of the foot receptacles 34, inserting cover 52 and adhering pad 14 within well 22. The mouse pad apparatus can be packaged and shipped as a unit.

The user removes cover 52 and threads the mouse cord through passageway openings 50 leaving as much cord as is necessary for full movement of the mouse 18 about the pad 14. The cover 52 closes the passageway upon inserting pins 56 and 58 into slots 60 and 62. The cord 20 of the mouse 18 is retained substantially in the same plane as the pad 14.

Figure 8:
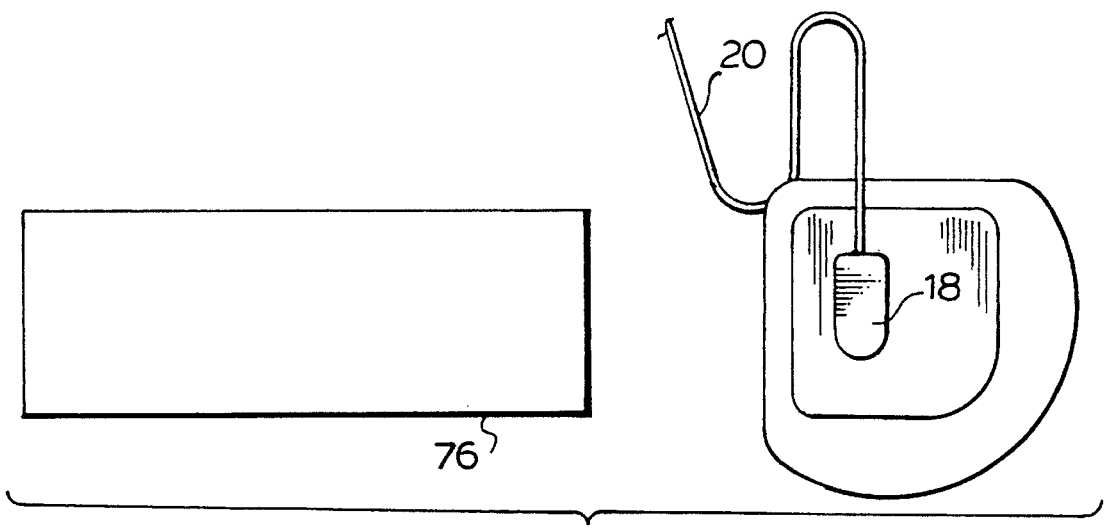
FIG. 8 is a top plan view of the mouse pad apparatus oriented in a right hand condition.
Figure 9:
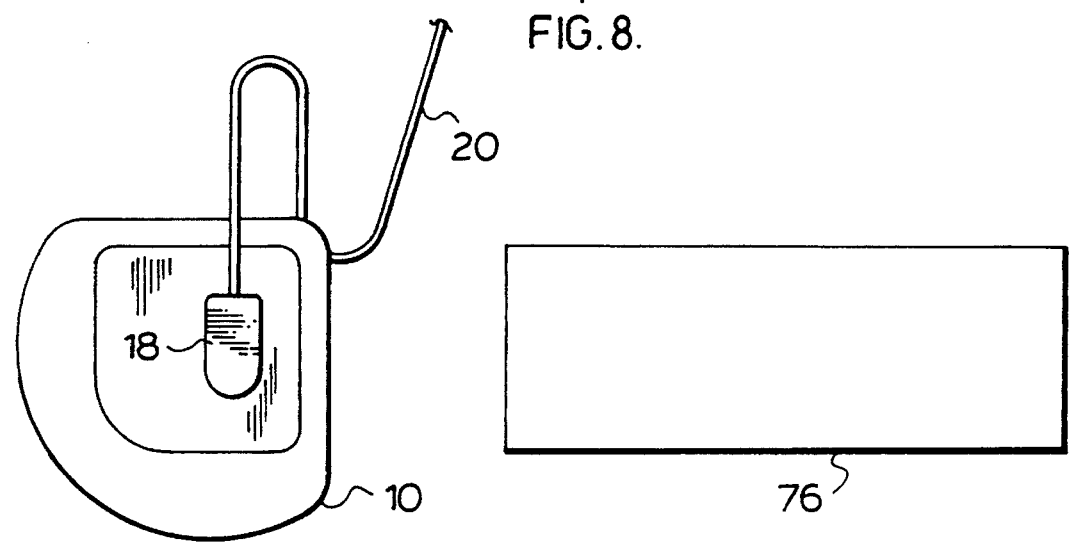
FIG. 9 is a top plan view of the mouse pad apparatus oriented in a left hand condition.

The mouse pad apparatus 10 is placed on the right hand side of a computer keyboard 76 as illustrated in FIG. 8. Alternatively, the user threads the cord 20 in the direction opposite and places the mouse pad apparatus 10 on the left hand side of the computer keyboard 76 in a left handed configuration.

Additionally, the base 12 could be sold as a unit without a pad 14. The well 22 is sized to receive existing mouse pads made of neoprene material. The user merely places a neoprene mouse pad in well 22 and adheres the neoprene pad therein for use.

Figure 10:
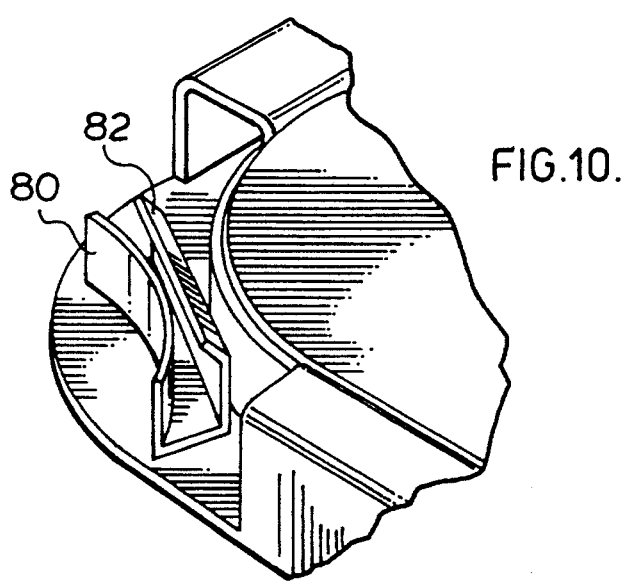
FIG. 10 is a perspective view of an open cord retainer.

Referring to FIG. 10, a clip 80 presenting an open passageway is illustrated. One arm of the clip 80 has a lip 82 for releasably retaining the mouse cord 20 therein. Clip 80 may be integrally molded or attached to the base.

It is now apparent to a person skilled in the art that the mouse pad apparatus of the present invention could be readily modified. It is understood that certain changes in style, size and components may be effective without departure from the spirit of the invention and within the scope of the appended claims.

I claim:

1. A mouse pad apparatus comprising a base supporting a mouse-receiving surface and a cord retainer for retaining a cord of a computer mouse, said cord retainer comprising an open passageway in said base and a cover for releasably covering said open passageway, said open passageway having entry points substantially in the same plane for releasably retaining said cord substantially co-planar with said mouse-receiving surface.

2. A mouse pad apparatus as claimed in claim 1 wherein said open passageway is sized to receive said cord of said computer mouse.

3. A mouse pad apparatus as claimed in claim 2 wherein said base is molded.

4. A mouse pad apparatus as claimed in claim 2 wherein said base has a non-slip support for substantially preventing slippage of said base relative to a surface supporting said base.

5. A mouse pad apparatus comprising a wrist supporting surface extending about 180° about a planar mouse-receiving surface, said wrist supporting surface being contoured to provide a rounded transition between a surface on which said apparatus supportable and said mouse-receiving surface.

6. A mouse pad apparatus having a cord retainer for retaining a cord of a computer mouse substantially co-planar with a mouse-receiving surface of said mouse pad apparatus and wrist supporting surface extending about 180° about said mouse-receiving surface.

7. A mouse pad apparatus as claimed in claim 6 wherein said mouse pad apparatus is orientable in a right-handed or left handed condition relative to a computer keyboard.

8. A mouse pad apparatus as claimed in claim 7 wherein said open passageway is sized to receive said cord of said computer mouse.

9. A mouse pad apparatus as claimed in claim 7 wherein said mouse pad apparatus further comprises a base for supporting said mouse-receiving surface.

10. A mouse pad apparatus as claimed in claim 9 wherein said cord retainer is opposite said wrist supporting surface.

11. A mouse pad apparatus as claimed in claim 10 wherein said cord retainer comprises an open passageway in said base and a cover for covering said passageway.

12. A mouse pad apparatus as claimed in claim 9 wherein said base wrist supporting surface are integrally molded together.

13. A mouse pad apparatus comprising a molded base having a streamline profile and having an outer peripheral surface surrounding a well adapted for receiving a pad, said outer peripheral surface having two adjacent sides extending substantially perpendicular to each other and two opposite sides extending arcuately from said adjacent sides, said two opposite sides, each having a contoured wrist supporting surface extending outwardly from said well, a cord retainer between each said two adjacent sides and comprising an open passageway integrally molded in said outer peripheral surface and a molded cover for covering said passageway, a pad affixed to said base within said well, said well having a depth wherein when said pad is fully registered therein said pad extends substantially coplanar with said adjacent and opposite sides, a plurality of rubber feet extending from an underside of said base, whereby said cord is threadable through said cord retainer in either a right-handed or left-handed direction and said mouse pad apparatus is orientable relative to a computer keyboard in either a right-handed configuration or a left-handed configuration.

14. A base for a mouse pad, said base comprising a surface for receiving said mouse pad and a cord retainer, said cord retainer comprising an open passageway in said base and a molded cover for releasably covering said passageway, said open passageway having entry points substantially in the same plane for releasably retaining said cord.

15. A base as claimed in claim 14 wherein said base further comprises a wrist supporting surface extending about the pad receiving surface.

16. A base as claimed in claim 15 wherein said wrist supporting surface is contoured to provide a rounded transition between a surface on which said base is supportable and said mouse-receiving surface.

* * * * *